June 25, 1968  R. O. ROBISON  3,390,319
CHARGING UNIT FOR A BATTERY-CONTAINING HANDLE
FOR AN ELECTRIC KNIFE OR THE LIKE
Filed Oct. 21, 1965
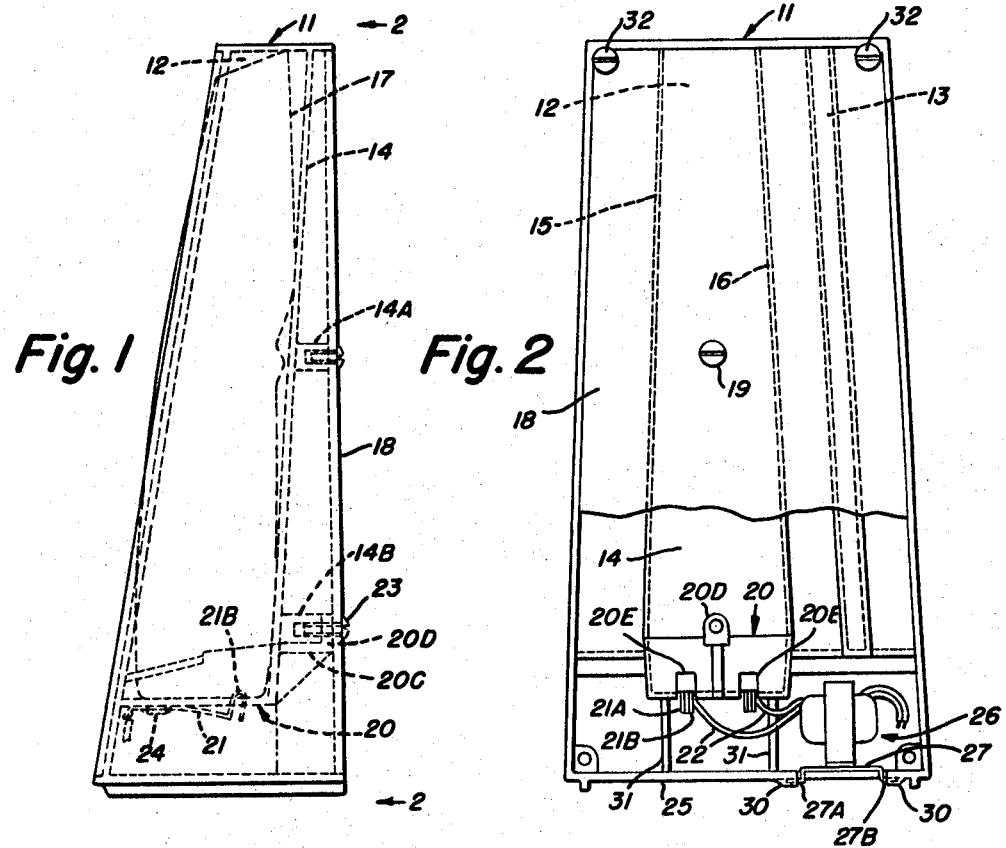
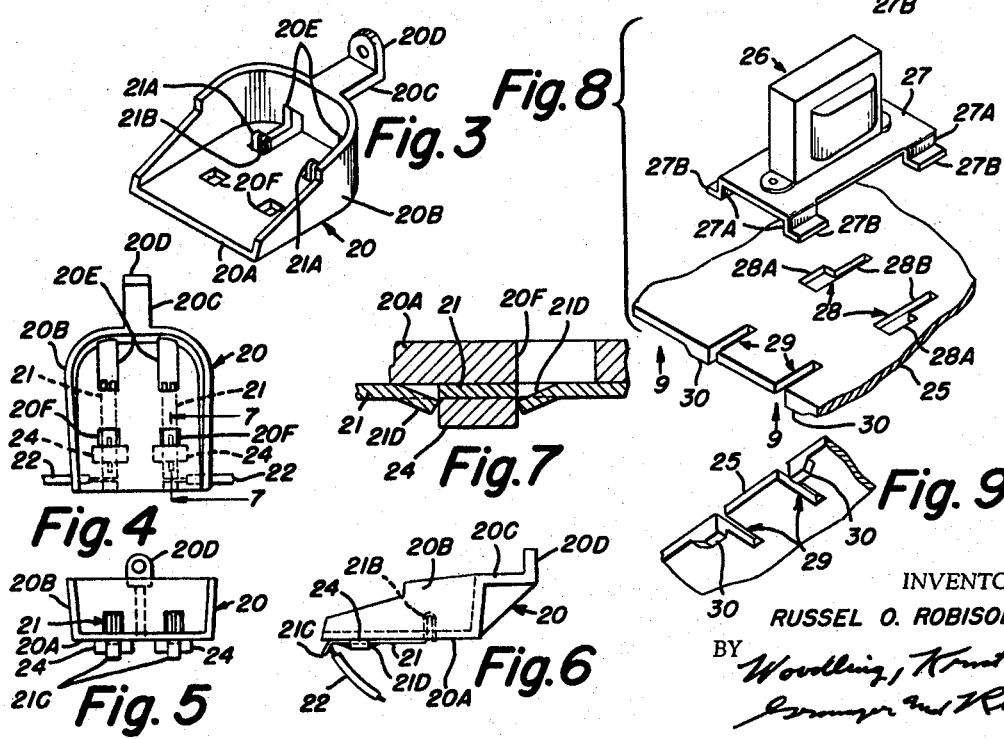
INVENTOR.
RUSSEL O. ROBISON United States Patent Office 3,390,319
Patented June 25, 1968

3,390,319
CHARGING UNIT FOR A BATTERY-CONTAIN-
ING HANDLE FOR AN ELECTRIC KNIFE OR
THE LIKE
Russell O. Robison, Plymouth, Ohio, assignor to
Dominion Electric Corporation, a corporation of
Ohio
Filed Oct. 21, 1965, Ser. No. 499,313
9 Claims. (Cl. 320—2)

My invention relates to charging units adapted for charging rechargeable batteries in an electric appliance such as those contained in a handle of an electric knife or the like.

An object of my invention is to provide an improved structure, a novel organization of parts for mounting, and a useful arrangement for assembly of the elements in a charging unit.

Another object is the provision of a member means for securing the transformer assembly of a charging unit within the casing or the charging unit.

Another object is the provision of a novel supporting member positioned within a casing of a unit which carries in operating position electrical contact members adapted to engage the terminals of a knife handle or other appliance having electrical contacts in circuit connection with a rechargeable battery therein.

Another object is the provision of an economical arrangement for efficiently and readily assembling the parts of a charging unit and for maintaining the same in a secured position.

Other objects and a fuller understanding of the invention may be had by referring to the following description and claims, taken in conjunction with the accompanying drawing, in which:

FIGURE 1 is a side view of a charging unit embodying the preferred form of my invention and showing internal parts thereof in broken lines.

FIGURE 2 is a rear view of the charging unit looking in the direction of the arrows 2—2 of FIGURE 1 and with a portion of the back wall removed to show the internal organization of the parts within the casing.

FIGURE 3 is a perspective view of a supporting bottom member utilized in my unit for supporting a handle of an electric knife or other appliance in the receiving well of the unit and which shows the electrical contacts of the charging unit.

FIGURE 4 is a plan view of the supporting bottom member shown in FIGURE 3.

FIGURE 5 is an end view of the supporting bottom member shown in FIGURES 3 and 4.

FIGURE 6 is a side view of the same.

FIGURE 7 is an enlarged detail view illustrating the mounting of the electrical contact elements to the bottom supporting member shown in FIGURES 3, 4, 5, and 6.

FIGURE 8 is a perspective view in an exploded arrangement illustrating the mounting of the transformer assembly of the charging unit to the bottom wall of the casing; and FIGURE 9 is a bottom view of the bottom wall of the casing looking in the direction of the arrows 9—9 of FIGURE 8.

My charging unit has an upstanding casing or cabinet 11. This casing or cabinet 11 has a recess or well 12 formed in the forward face thereof for accommodating a knife handle 17 or other appliance therein and which contains rechargeable batteries. The casing 11 has a top wall and therebelow has side walls 15 and 16, and a back wall 14 defining the well. The front of the casing is open so as to permit the ready insertion and withdrawal of a knife handle 17 or the like in the well.

Also provided in the casing 11 is a longitudinal recess 13 opening at the front of the casing for accommodating knife blades or the like which are adapted to be associated with a knife handle 17.

Secured to the back of the casing 11 is a removal back wall 18, the wall being secured by four screws 32 at each corner thereof. This back wall 18 is also secured by screw 19 to a post 14A extending rearwardly from the back wall 14 of the recess or well.

Closing the bottom of the well is a bottom support member 20. This support member 20 has a bottom wall 20A which is adapted to support the bottom end of a knife handle 17 or the like. Extending upwardly from three sides of the bottom wall 20A are the side walls 20B as shown in the drawing. Extending backwardly from the rearwardmost portion of the side walls 20B is a tongue portion 20C generally parallel to the bottom wall 20A. Extending upwardly from the rearward end of the tongue portion 20C is an end flange 20D. A screw 23 extends through aligned openings in the back wall 18, in the flange 20D and a post 14B projecting rearwardly from the wall 14.

The bottom wall 20A rests upon two parallel supporting walls or ribs protruding upwardly from the bottom wall 25 of the casing. Between the support given by the ribs 31 and the flange 20D secured by screw 23, the support member 20 is firmly held in position. At the same time it may be readily removed from the casing by the removal of the screw 23 so as to free the end flange 20D and thus to permit the support member to be lifted out of the casing from the top of the ribs 31.

Adjacent to the rearward side of the bottom wall 20A of the support member 20 and extending upwardly in the side wall 20D are a pair of parallel slots 20E. In line with the slots 20E and closer to the edge of the bottom wall 20A are a pair of openings 20F. A pair of spring contact strips 21 of electric insulating material are secured to the bottom surface of the bottom wall 20A of support member 20. These strips 21 are resilient and are so biased that their free ends which are bent, as illustrated, extend upwardly through the slots 20E. These bent-over free ends of the strips 21 are bifurcated so that each bent free end has a tine 21A and a tine 21B. Each of these tines is independently resilient so as to be partially independent of the other upon downward pressure on the top surfaces of the tines. This improves the degree of engageability of the free ends of the strips with the electrical contacts exposed in the bottom wall of a handle 17 or the link positioned in the well of the casing. In the event that the surface of a contact in the knife handle is not exactly parallel with the top surface of a free end of a strip 21 the bifurcation of the free ends aids in obtaining a better engagement between the strips 21 and the exposed contacts in the handle 17 which in turn are in circuit arrangement with a battery therein.

The other ends of the strips 21 are bent downwardly to provide the terminal portions 21C, which are soldered to wires 22 connected to a transformer assembly 26 within the casing. To anchor the strips 21 to the bottom wall 20A, there are provided two saddles 24 integral with the bottom wall 20 and projecting downwardly therefrom. These saddles 24 intermediate their ends are spaced somewhat from the bottom surface of the wall 20A to permit the strips 21 to slide therebetween. The saddles 24 hold the strips 21 snugly up against the bottom surface of the bottom wall 20A. The openings 20F aid in inserting the strips 21 in the space between the saddles 24 and the bottom wall 20 otherwise difficult by reason of the bent downward ends 21C. The strips are tilted so as to first allow them to extend partially through the openings 20F and then straightened to insert them between the saddles 24 and the bottom wall 20A. To prevent the strips 21 from again moving outwardly from their firm position held by the saddles 24, the strips 21 each have a pair of pronged or off-set portions 21D inclined at an angle downwardly from the plane of the strip. These portions 21D are sufficiently resilient as to yield when the strips are forced longitudinally through the space between the saddles 24 and the bottom wall 20A. However these portions 21D are biased downwardly so that after a strip is in position, such as shown in FIGURE 7, the portions 21D move downwardly to their biased position illustrated and engage the sides of the respective saddles 24. Removal of the strip is resisted by the digging of each portion 21D into the side of a saddle 24. The mounting of each strip 21 to the bottom wall 20A is similar.

It is thus noted that the bottom support member 20 carried the resilient contact members and this in turn is readily mounted within the casing as shown and may be readily removed thereof for servicing as required.

In the charging unit, a transformer and rectifier as an assembly are indicated by the reference character 26. The rectifier is positioned within the coil of the transformer and in circuit arrangement therewith. The transformer assembly 26 is mounted on a flat rectangular metal base 27. This base 27 has four legs 27A bent downwardly therefrom adjacent the four corners of the base. Extending laterally outward from the lower ends of legs 27A are four feet 27B, respectively. The feet 27B are disposed in a plane substantially parallel to the plane of the main body of the base 27.

Formed in the bottom wall 25 of the casing 11 are four slots for accommodating the legs 27A of the base 27. Spaced inwardly from the rear edge of the bottom wall 25 are a pair of spaced parallel openings 28. Each of these openings 28 has a wide part 28A and a narrow part 28B. Thus the openings 28 in effect are keyholes and have the shape illustrated in the drawing and particularly FIGURE 8.

Extending through the bottom wall 25 and from the rearward edge thereof are a pair of slots 29 of uniform width. These slots 29 are parallel to each other and in alignment with the narrow part 28B of slots 28. Extending downwardly from the lower surface of the bottom wall 25 at the rearward edge thereof and at the entrance to each slot 29 is a boss or projecting portion 30. One boss 30 is adjacent one slot 29 and the other boss 30 is adjacent the other slot illustrated in FIGURES 8 and 9. The bottom wall 25, being of molded plastic and being relatively thin, is somewhat resiliently yieldable to lateral pressure. The pressure on the bottom wall 25 at the location of the bosses 30 so as to press the bosses 30 upwardly so distort the bottom wall 25 as to move the bosses 30 up out of the plane of the bottom surface of the wall 25. In other words the portion of the bottom wall 25 adjacent to bosses 30 may be resiliently tipped upwardly under pressure as to displace the bosses 30 from the normal position shown in the drawing.

For mounting the transformer assembly 26 to the casing and to the bottom wall 25 the assembly is moved forwardly in the casing parallel to the slots 28 and 29 while the back wall 18 is removed. In this movement the innermost legs 27A are inserted downwardly so as to move the feet 27B of such innermost legs down through the wide part 28A of the respective slots 28, the width of the parts 28A being sufficient to permit the feet 27B to be inserted downwardly therethrough. The transformer assembly 26 is then adjusted so that the base member 27 is substantially parallel to the bottom wall 25 and is slid toward the front of the casing. This moves the innermost feet 27A forwardly into the narrow parts 28B of slot 28. To allow for clearance of the bosses 30, the bosses 30 are pressed upwardly out of the plane of the bottom surface of the wall 25 so as to permit the feet 27B of the rearwardmost pair of legs to enter the slots 29. As soon as the base 27 has moved rearwardly a sufficient distance that the bosses 30 are cleared by the feed 21D of the outermost legs, the bosses 30 are permitted to resume their normal downward position shown in the drawing and to thus lock the base member against sliding outwardly from the slots. Thus, the bosses 30 lock the transformer assembly 26 in firm position within the casing and to the bottom wall 25. If it is desired to remove the assembly 26 for service and the like, the operation may be reversed by pressing the bosses upwardly and then sliding the assembly 26 outwardly in a general plane parallel to the respective slots 28 and 29 and raising the assembly 26. The transformer assembly 26 is connected by suitable wires to a source of electrical energy and the transformer assembly 26 in turn is connected by wires 22 to the strip contact 21.

The structure and arrangement shown provide ease and economy in assembling the parts of the unit, and a strong, serviceable charging unit is obtained.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. In a charging unit for a battery-containing handle of an electric knife or the like, the handle having a pair of battery-connected spaced electrical contacts exposed adjacent the bottom thereof, comprising the combination of a casing of molded plastic material, said casing having a well formed in the forward face thereof having upright side walls and rear wall and against which a said handle may be leaned for maintaining the handle in a substantially upright position, the said well having an open forward side through which the handle may be moved in inserting it and removing it from the well, a bottom member carried by the casing and disposed at the bottom of said well for supporting a said handle therein, said bottom member having a bottom wall, said bottom wall having a pair of laterally opened slots extending therethrough, a pair of resilient electrical contact members positioned below said bottom member, each of said contact members having an anchored end portion and a free end portion resiliently movable relative to the plane of said bottom wall upon flexing of the contact members, said free end portions each being bent to protrude upwardly through the respective said slots under the resilient bias of the contact members for electrical engagement with the exposed electrical contacts, respectively, of a handle disposed in said well, each of said free end portions being bifurcated to provide independently resilient parallel portions engageable with said electrical contact of said handle, said bottom member having a pair of spaced downwardly directed saddle portions adjacent said anchored end portions of the contact members and defining apertures between the saddle portions and said bottom wall, said anchored end portions being extended through the respective apertures and held by said saddle portions, each anchored end portion at opposite sides of the saddle portion being slit and bent downwardly at an acute angle to the plane of the contact member to engage the sides of the saddle portions and to resist removal of the anchored end portions from the apertures and thereby retain the contact member to the bottom member.

2. The combination as claimed in claim 1 and in which said bottom member includes side walls registering with said upright side walls and rear wall of the well, and a rearward projecting portion secured to said rear wall for supporting the bottom member, and in which the bottom wall of said bottom member has openings therethrough adjacent said saddle portions to facilitate insertion of the contact members into said apertures.

3. In a charging unit for a battery-containing handle of an electric knife or the like, the handle having a pair of battery-connected spaced electrical contacts exposed adjacent the bottom thereof, comprising the combination of a casing having a well formed therein for receiving a said handle in upright position, a supporting member of electrical insulating material carried by the casing at the bottom of the well for supporting a said handle in the well, said supporting member having a pair of spaced slots extending therethrough and in general alignment with the said electrical contacts of a handle located in the well, a pair of elongated resilient contact strips of electrical conducting material disposed in parallel relationship against the bottom wall of said supporting member, said strips having bent-up portions adjacent their free ends disposed to extend upwardly through said slots under the bias of said strips being anchored to the bottom of said support member at locations spaced from said free ends to hold the strips upwardly against the bottom of the support member, said strips being electrically connected to a source of electrical energy for transmitting a charging current to said bent-up portions, said strips being anchored to the support member by projections on the bottom of the support member extending under the strips to hold them up against said bottom, and said strips being upset from the planes of the strip to engage the respective rejections to resist removal of the strips from the projections.

4. In a charging unit for a battery-containing handle of an electric knife or the like, the handle having a pair of battery-connected spaced electrical contacts exposed adjacent the bottom thereof, comprising the combination of a casing having a bottom wall and a well formed in the casing for receiving a said handle, spring-biased electrical contact members carried on the casing and disposed to engage said contacts of a handle in said well, a transformer-rectifier assembly in said casing adapted to be mounted to a source of electrical energy and in electrical connection with said contact members to provide charging current to the same, said assembly being mounted on a base having a flat portion secured to said assembly and a first pair of off-set portions at one end and a second pair of off-set portions at an opposite end extending downwardly from said flat portion at spaced location extending at an angle to the respective leg portion, extending at an angle to the base portion and a foot portion extending a an angle to the respective leg portion, said bottom wall of the casing having formed therein a first pair of slots and a second pair of slots, said first pair of slots being spaced from the outer edge of said bottom wall and each having a wide portion and a narrow portion, the side portions being sufficiently large in size to permit direct insertion of the foot portions of said first pair of off-set portions therethrough and the narrow portions being sufficiently narrow in size as to prevent direct withdrawal of the foot portions of said first pair of off-set portions therefrom upon the first pair of off-set portions inserted in said wide portions being moved along the first pair of slots into alignment with said narrow portions, said second pair of slots extending from an edge of said bottom wall of the casing to permit said second off-set portions to be moved therein from said edge, the width of the slots of said second pair of slots being sufficient in width to permit the leg portions of the second pair of off-set portions to move therealong and sufficiently limited in width to prevent direct withdrawal of the foot portions therefrom.

5. The combination claimed in claim 4 and including bosses carried by said bottom wall and extending downwardly therefrom adjacent the said edge of the bottom wall and alongside the outer ends of said second pair of slots and in line with the foot portions of the off-set portions in the second pair of slots to limit movement of said off-set portions longitudinally of the slots of said second pair of slots and outwardly of said bottom wall, said bottom wall being sufficiently flexible to permit the bosses to be pressed upwardly out of the plane of the lower surface of said bottom wall to allow the second pair of off-set portions to move longitudinally in and out of said second pair of slots from said edge.

6. Improved means for mounting a transformer assembly to the bottom wall of the molded plastic casing of a charging unit, comprising a rectangular base member carrying said transformer assembly, said base member having a leg extending downwardly adjacent each corner thereof, the free ends of said legs being bent at an angle thereto and substantially parallel to the plane of said base member, said base wall having a first pair of parallel spaced slots extending therethrough at a distance from an edge of the bottom wall, said slots of the first pair of slots being contoured to permit insertion of a first pair of said legs therethrough and locking of the said legs therein against withdrawal away from the plane of said bottom wall upon sliding of the legs in the slots longitudinally thereof away from said edge, said bottom wall having a second pair of parallel spaced slots extending therethrough from said edge of the bottom wall, said slots of the second pair of slots being contoured to permit sliding of the legs of a second pair of said legs, from said edge longitudinally of the slots and into the slots but to prevent withdrawal away from the plane of said bottom wall, the free ends of said legs being disposed beneath said bottom wall to hold the transformer assembly down on said bottom wall.

7. The improved means claimed in claim 6 and including detent means carried by said bottom wall adjacent said edge and alongside said second pair of slots in alignment with the free ends of the second pair of legs to limit longitudinal movement of the second pair of legs relative to said second pair of slots, said detent means being manually displaceable from said alignment with said free ends to permit said longitudinal movement of the second pair of legs.

8. In a charging unit having a casing, the casing having a bottotm wall and a wall for receiving a battery-containing handle of an electric knife or the like, the handle having battery-connected spaced contacts exposed for electrical engagement, the combination of a support member positioned in the bottom of said well for supporting a said handle therein, said support member being independently removable from, and mounted in said casing, a pair of spring biased electrical contacts anchored to said support member on the bottom thereof, said support member having spaced slots therein, said contact members having free ends extending upwardly and biased to protrude through said slots to engage said contacts of a handle in said well, a transformer assembly in said casing and electrically connected to said contact members, a base member secured to said transformer assembly, legs extending downwardly from said base member, said legs having angularly disposed ends, said bottom wall of the casing having slots formed therein for accommodating said legs, the angularly disposed ends of the legs underlying said bottom wall to hold the base member down on the bottom wall, some of said slots extending from an edge of the bottom wall to permit lengthwise sliding of some legs into said some slots from said edge, other of said slots being keyed to permit insertion of others of said legs downwardly into the slots and then longitudinally thereof to be locked therein.

9. The combination claimed in claim 8 and including bosses integral with and extending downwardly from the bottom wall adjacent said edge at the entrance of said other slots in alignment with the angularly disposed free ends of said other legs slidable in said other slots, said bottom wall being resiliently flexible to permit said bosses to be moved out of said alignment.

References Cited
UNITED STATES PATENTS 3,176,062    3/1965    Nordstrom et al. _____ 336—65 X
3,348,116    10/1967    Freeman et al. _____ 320—2

JOHN F. COUCH, *Primary Examiner.*

WARREN E. RAY, *Examiner.*

S. WEINBERG, *Assistant Examiner.*